(12) United States Patent
Moriyasu

(10) Patent No.: US 9,443,439 B2
(45) Date of Patent: Sep. 13, 2016

(54) FIGURE PLATE SET

(71) Applicant: PASCAL CO., LTD., Kurashiki-shi, Okayama (JP)

(72) Inventor: Hiroki Moriyasu, Kurashiki (JP)

(73) Assignee: PASCAL CO., LTD., Kurashiki-shi, Okayama (JP)

( * ) Notice: Subject to any disclaimer, the term of this patent is extended or adjusted under 35 U.S.C. 154(b) by 0 days.

(21) Appl. No.: 14/629,492

(22) Filed: Feb. 24, 2015

(65) Prior Publication Data

US 2015/0170528 A1    Jun. 18, 2015

Related U.S. Application Data

(63) Continuation of application No. PCT/JP2013/074041, filed on Sep. 6, 2013.

(30) Foreign Application Priority Data

Sep. 14, 2012 (JP) ................. 2012-202897

(51) Int. Cl.
| | | |
|---|---|---|
| G09B 1/34 | (2006.01) | |
| G09B 23/02 | (2006.01) | |
| G09B 23/04 | (2006.01) | |
| A63F 9/12 | (2006.01) | |
| A63F 9/10 | (2006.01) | |
| A63H 33/04 | (2006.01) | |

(52) U.S. Cl.
CPC . *G09B 1/34* (2013.01); *A63F 9/10* (2013.01); *A63F 9/1044* (2013.01); *A63F 9/12* (2013.01); *A63H 33/04* (2013.01); *G09B 23/02* (2013.01); *G09B 23/04* (2013.01)

(58) Field of Classification Search
USPC .............. 434/211; 273/157 R; D21/478, 480
See application file for complete search history.

(56) References Cited

U.S. PATENT DOCUMENTS

| | | | | |
|---|---|---|---|---|
| 1,261,710 A * | 4/1918 | Coyle | ............... | A63F 9/10 |
| | | | | 273/157 R |
| 6,145,837 A * | 11/2000 | Silvey | ............... | A63F 9/12 |
| | | | | 273/157 R |
| 2006/0076732 A1* | 4/2006 | Chiou | ............... | A63F 9/10 |
| | | | | 273/153 R |

FOREIGN PATENT DOCUMENTS

| | | |
|---|---|---|
| JP | S48-015175 Y | 4/1973 |
| JP | S55-034859 U | 3/1980 |

(Continued)

OTHER PUBLICATIONS

International Search Report for PCT/JP2013/074041 dated Dec. 10, 2013.

(Continued)

*Primary Examiner* — Xuan Thai
*Assistant Examiner* — James Hull
(74) *Attorney, Agent, or Firm* — Yokoi & Co., U.S.A.; Toshiyuki Yokoi

(57) ABSTRACT

The present invention provides a figure plate set for learning that comprises a first triangular plate (1) having an angle of 45°, an angle of 45°, and an angle of 90° and a second triangular plate (2) having an angle of 30°, an angle of 60°, and an angle of 90°. A length of one of two orthogonal sides (7, 8) of the first triangular plate (1) is same as a length of one of two orthogonal sides (14, 16) of the second triangular plate. A new triangular shape can be formed by combining the first triangular plate (1) and the second triangular plate (2).

9 Claims, 9 Drawing Sheets

(56) References Cited

FOREIGN PATENT DOCUMENTS

| JP | H01-074196 U | 5/1989 |
| JP | H01-305983 A | 12/1989 |
| JP | H02-027392 U | 2/1990 |
| JP | 3033025 U | 10/1996 |
| JP | 3039517 U | 5/1997 |
| JP | H10-151895 A | 6/1998 |

OTHER PUBLICATIONS

PCT written openion dated Dec. 10, 2013.

* cited by examiner

FIGURE PLATE SET

CROSS-REFERENCES TO RELATED APPLICATIONS

This Application claims the benefit of priority and is a Continuation application of the prior International Patent Application No. PCT/JP2013/074041, with an international filing date of Sep. 6, 2013, which designated the United States, and is related to the Japanese Patent Application No. 2012-20897, filed Sep. 14, 2012, the entire disclosures of all applications are expressly incorporated by reference in their entirety herein.

BACKGROUND OF THE INVENTION

1. Field of the Invention

The present invention relates to a figure plate set for leaning.

2. Description of Related Art

Figure plates can be used as a learning material for understanding figures and geometry. If a plurality of figure plates is prepared and a combination of an arrangement of the figure plates is changed in a planar shape, various figures having different outer shapes can be formed. This helps a user to understand characteristics of the figures.

For example, in a teaching blackboard for calculating area of plane figures disclosed in Patent Document 1, a plurality of figure plates having a triangular shape is provided. On the blackboard, a combination of an arrangement of the figure plates is arbitrarily changed, and an outer shape formed by the plurality of figure plates can be changed to various triangles, a rectangle, and a parallelogram. This helps the user to understand various basic figures and calculation method of an area of various figures.

In addition, in a figure puzzle disclosed in Patent Document 2, four triangular cards are provided. By combining the triangular cards, basic shapes of the figure, such as a regular tetragon, a rectangle, a parallelogram, a rhombus, a trapezoid, and a triangle can be formed. By the above configuration, the user can operationally and visually understand basic shapes of the figure.

[Patent Document 1] Japanese examined utility model application publication No. S48-15175.

[Patent Document 2] Japanese unexamined utility model application publication No. S55-34859.

Although the figure plates and the triangular cards described above can help the user to understand the basic shapes generally, they are not suitable for helping the user to deepen the understanding of geometric thinking related to the figure. For example, in order to deepen the understanding of the triangle, it is not enough even if only the shape of the triangle is understood. A relation between "ratio of side length" and "angle" should be understood as geometric thinking. In addition, a positional relation between the triangle and a circumscribed circle or between the triangle and an inscribed circle should be understood. Furthermore, trigonometrical function should be understood.

The present invention provides a figure plate set that helps the user to deepen the understanding of the geometric thinking related to the triangle, which is a basic shape of the plane figures.

BRIEF SUMMARY OF THE INVENTION

The present invention discloses a figure plate set for learning, comprising: a first triangular plate having angles of 45°, 45° and 90°; and a second triangular plate having angles of 30°, 60° and 90°, wherein a length of one of two orthogonal sides of the first triangular plate is same as a length of one of two orthogonal sides of the second triangular plate, and a new triangular shape can be formed by combining the first triangular plate and the second triangular plate.

In the figure plate set of the present invention, if a length of the long side of two orthogonal sides of the second triangular plate is same as a length of one of two orthogonal sides of the first triangular plate, an acute-angled triangle having an angle of 75° can be newly formed by combining the first triangular plate and the second triangular plate. On the other hand, if a length of the short side of two orthogonal sides of the second triangular plate is same as a length of one of two orthogonal sides of the first triangular plate, an obtuse-angled triangle having an angle of 105° can be newly formed by combining the first triangular plate and the second triangular plate. In the above two configurations, the second triangular plate of the second configuration has a different size compared to the second triangular plate of the first configuration, but has a similar shape.

In other words, the figure plate set of the present invention has two different configurations. Therefore, if one of the configurations is selected, an acute-angled triangle having an angle of 75° or an obtuse-angled triangle having an angle of 105° can be newly formed by combining the first triangular plate and the second triangular plate.

From the above, the user can experientially understand that an angle of 75° is a sum of an angle of 45° and an angle of 30°, and an angle of 105° is a sum of an angle of 60° and an angle of 45°. Also, the user can experientially understand positions of three angles and a relation between "ratio of side length" and "angle" for the triangle having an angle of 75° or an angle of 105°. Thus, the user can improve an ability of geometric thinking about the triangle, and the user can understand meaning of the angle of 75° and the angle of 105° in relation to the trigonometrical function. The first triangular plate and the second triangular plate can be easily turned over because they are plate-like members. From the above, fixed understanding about the shape of the triangle is prevented and flexible understanding is enabled. The figure plate set can be rotated on a plane. This also helps the flexible understanding.

In the figure plate set of the present invention, it is preferred that a group of figure plates is further provided so that an outer shape of the group of figure plates matches the new triangular shape when the group of figure plates is combined, and when the group of figure plates is combined so that the outer shape of the group of figure plates matches the new triangular shape, a point of contact of apexes of all or a part of the group of figure plates matches a circumcenter of the new triangular shape. By the above configuration, in addition to combining a plurality figure plates, which comprises the group of figure plates, the user places the first and second triangular plates on the combined group of figure plates. This helps the user to understand a relation between a circumscribed circle of the triangle and a circumcenter.

It is preferred that a plate member is further provided so that the first triangular plate, the second triangular plate and the group of figure plates are fitted into the plate member in two layers. By the above configuration, the triangular plates and the figure plates can be positioned. This helps the user to learn easily and to store the figure plate sets easily.

It is preferred that a circumscribed circle of the new triangular shape is shown on the plate member. By the above configuration, the user can experientially understand a relation between the triangle and the circumscribed circle when the user fits the triangular plates and the figure plates into the plate member.

It is preferred that the group of figure plates is formed by three pieces of triangular plates having an isosceles triangular shape. The above configuration helps the user to understand a relation between a circumferential angle and a central angle.

It is preferred that the group of figure plates is formed by five pieces of triangular plates, one of the triangular plates has an isosceles triangular shape having an angle of 15°, two of the triangular plates have a right-angled triangular shape having angles of 60° and 30°, the right-angled triangular shape being made by equally dividing an equilateral triangle into two, and another two of the triangular plates have an isosceles triangular shape having angles of 45°, the isosceles triangular shape being made by equally dividing a regular tetragon into two. By the above configuration, new figures can be formed by combining the triangular plates selected from five triangular plates. Since the variation of the formed figures is increased, the learning effect is improved.

It is preferred that the group of figure plates is classified by color according to a shape of the figure plates. By the above configuration, the user can deepen the understanding of the figures through the vision.

It is preferred that the five pieces of triangular plates are classified by color so that the isosceles triangle having an angle of 15°, the right-angled triangle having angles of 60° and 30°, and the isosceles triangle having angles of 45° can be distinguished from others. By the above configuration, the user can deepen the understanding of the figures through the vision. Furthermore, when the user arbitrarily selects the triangular plates from five triangular plates and combines them, the user can consider the color and the angle in association with each other. Thus, the learning effect is improved.

It is preferred that an indicator indicating a similar triangle and another indicator of at least one of an inscribed circle and a circumscribed circle of the similar triangle are indicated on at least one of the first triangular plate and the second triangular plate. By the above configuration, the user can easily understand similar figures and a relation between the triangle and an inscribed circle or between the triangle and a circumscribed circle.

It is preferred that a line that divides the new triangular shape into a plurality of figures is shown on the first triangular plate and the second triangular plate, and a point of contact of apexes of all or a part of the plurality of figures matches with the circumcenter of the new triangular shape. By the above configuration, the user can also understand the relation between the triangle and a circumscribed circle or between the triangle and a circumcenter.

By using the present invention, concerning the triangle having an angle of 75° and an angle of 105°, the user can experientially understand the positions of three angles and a relation between "length rate of sides" and "angle." Thus, ability of geometric thinking about the triangle is increased, and meaning of the angle of 75° and the angle of 105° can be understood in relation to the trigonometrical function.

DETAILED DESCRIPTION OF THE INVENTION

Figure 1:
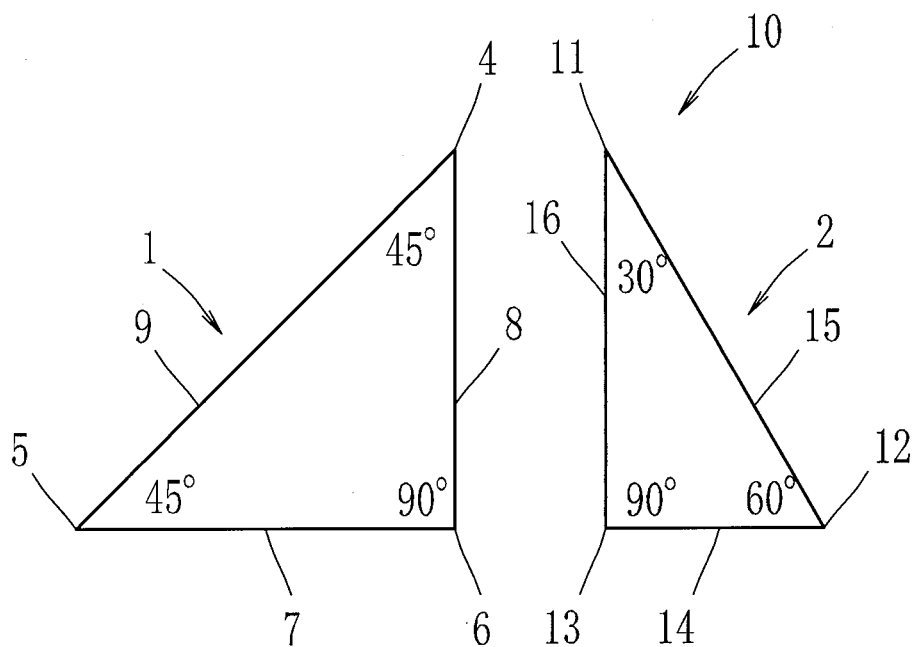
FIG. 1 is a plan view showing a figure plate set concerning the first embodiment of the present invention.

Hereafter, an embodiment of the present invention will be explained with reference to the drawings. FIG. 1 is a plan view showing a figure plate set 10 concerning the first embodiment of the present invention. The figure plate set 10 is comprised of a triangular plate 1 and a triangular plate 2. The triangular plate 1 is an isosceles right triangle having an angle of 45° at an apex 4, an angle of 45° at an apex 5, and an angle of 90° at an apex 6. A length ratio of a side 7, a side 8 and a side 9 is $1:1:\sqrt{2}$.

The triangular plate 2 is a right-angled triangle having an angle of 30° at an apex 11, an angle of 60° at an apex 12, and an angle of 90° at an apex 13. A length ratio of a side 14, a side 15 and a side 16 is $1:2:\sqrt{3}$. On the triangular plate 1 and the triangular plate 2 of FIG. 1, angles are indicated on each of the apexes. However, the indication of the angle can be omitted.

Figure 2:
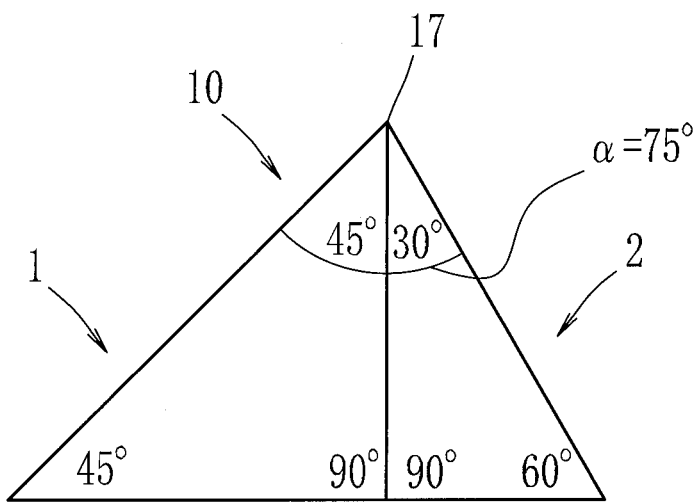
FIG. 2 is a plan view showing a state that a triangular plate 1 and a triangular plate 2 of FIG. 1 are combined.

In the triangular plate 1, the side 7 and the side 8 are same length and are perpendicular to each other forming a right angle at the apex 6. In the triangular plate 2, the side 16, which is the long side, and the side 14, which is the short side, are perpendicular to each other forming a right angle at the apex 13. A length of the side 7 and the side 8 of the triangular plate 1 is same as a length of the side 16 of the triangular plate 2. Therefore, if the triangular plate 1 and the triangular plate 2 are combined aligning the side 8 with the side 16, a new triangle can be formed. FIG. 2 is a plan view showing a state that the triangular plate 1 and the triangular plate 2 are combined. In FIG. 2, an angle α is 75°, which is a sum of 45° and 30°.

As explained above, the figure plate set for learning shown in FIG. 1 is comprised of a first triangular plate having angles of 45°, 45° and 90°, and a second triangular plate having angles of 30°, 60° and 90°, wherein a length of one of two orthogonal sides of the first triangular plate is same as a length of one of two orthogonal sides of the second triangular plate, and a new triangular shape can be formed by combining the first triangular plate and the second triangular plate.

In order to make learning efficiency using the figure plate set 10, a guide indicating a method of using the figure plate set 10 should be prepared in advance. Information useful for geometric thinking using the triangular plate 1 and the triangular plate 2 should be written in the guide. For example, meanings of the shapes of the triangular plate 1 and the triangular plate 2, a relation between "ratio of side length" and "angle," and a calculating method of a length of the sides can be written. Similarly, a meaning of a shape of the new triangle formed by combining the triangular plate 1 and the triangular plate 2 can be written, for example.

If the above described guide is used simultaneously, the user can recognize that the triangular plate 1 is made by equally dividing a regular tetragon into two, and the user can experientially understand positions of an angle of 45° and an angle of 90° and a relation between "ratio of side length" and "angle." Similarly, the user can recognize that the triangular plate 2 is made by equally dividing an equilateral triangle into two, and the user can experientially understand positions of an angle of 30°, an angle 60° and an angle of 90° and a relation between "ratio of side length" and "angle."

Furthermore, the present embodiment can help geometric thinking of the triangle by using the triangular plate 1 and the triangular plate 2 in combination. When the triangular plate 1 and the triangular plate 2 are combined, an acute angled triangle having an angle of 75° can be formed as shown in FIG. 2. Therefore, the user can experientially understand that an angle of 75° is a sum of an angle of 45° and an angle of 30°.

In addition, the user can experientially understand that the triangle having an angle of 75° is a triangle formed by combining the triangular plate 1, which is made by equally dividing a regular tetragon into two, and the triangular plate 2, which is a triangle made by equally dividing an equilateral triangle into two. From the above, as for the triangle having an angle 75°, the user can experientially understand the positions of an angle 75°, an angle of 60° and an angle of 45°, and the relation between "ratio of side length" and "angle." From the above understanding, as explained later, the user can increase the ability of geometric thinking about the triangle and the user can understand a meaning of an angle of 75° in relation to the trigonometrical function.

Figure 3:
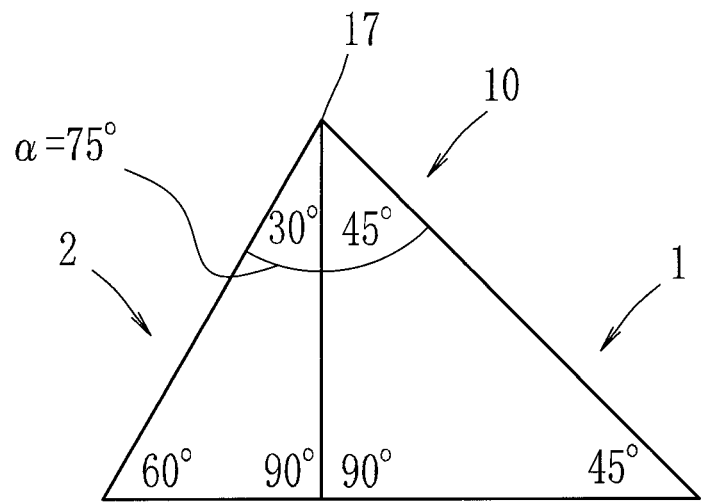
FIG. 3 is a plan view showing a state that the figure plate set shown in FIG. 2 is turned over.

FIG. 3 is a plan view showing a state that the figure plate set 10 shown in FIG. 2 is turned over. The triangular plate 1 and the triangular plate 2 can be easily turned over because they are plate-like members. From the above, fixed thinking about the shape of the triangle is prevented and flexible thinking is enabled. The figure plate set 10 can be rotated on a plane. This also helps the flexible thinking.

Figure 4:
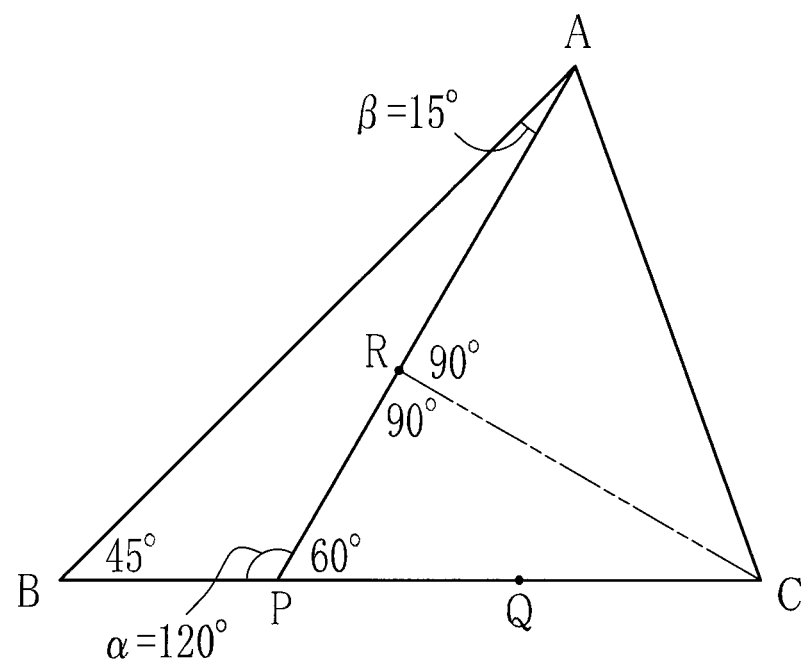
FIG. 4 is a diagram showing an example of an exercise of geometric thinking about a triangle.

FIG. 4 is a diagram showing an example of an exercise of geometric thinking about the triangle. In a triangle ABC shown in FIG. 4, an angle is 45° at an apex B, and one of the divided angles at a point P is 60°. The point P and a point Q are points equally dividing a side BC into three. The example of the exercise shown in FIG. 4 is calculating an angle at an apex C under given conditions described above. It can be directly calculated that an angle α is 120° and an angle β is 15°. However, the angle at the apex C cannot be calculated only from the above. A perpendicular line CR should be drawn orthogonal a line AP.

On the other hand, a triangle APC is a triangle having an angle of 60°. In this point, the triangle APC is same as the triangle shown in FIG. 2. Therefore, if the user experientially understands the triangle shown in FIG. 2, the user can think of drawing the perpendicular line CR in FIG. 4 because the user knows that the figure plate set 10 shown in FIG. 2 is formed by combining the triangular plate 1 and the triangular plate 2 to form the perpendicular line between them. Namely, the user can increase the ability of the geometric thinking by the learning using the figure plate set 10.

An angle of 75° is dealt with in the addition theorem of trigonometrical function learned in mathematics in high school. For example, a value of sin (75°) is calculated by changing the formula into sin (45°+30°) and then using the addition theorem. As described above, the user can operationally and visually understand that an angle of 75° is a sum of an angle of 45° and an angle of 30° by the figure plate set 10. If the above logic is understood in association with sin (45°+30°), the user can deepen the geometric thinking about the triangle in association with the trigonometrical function.

Figure 5:
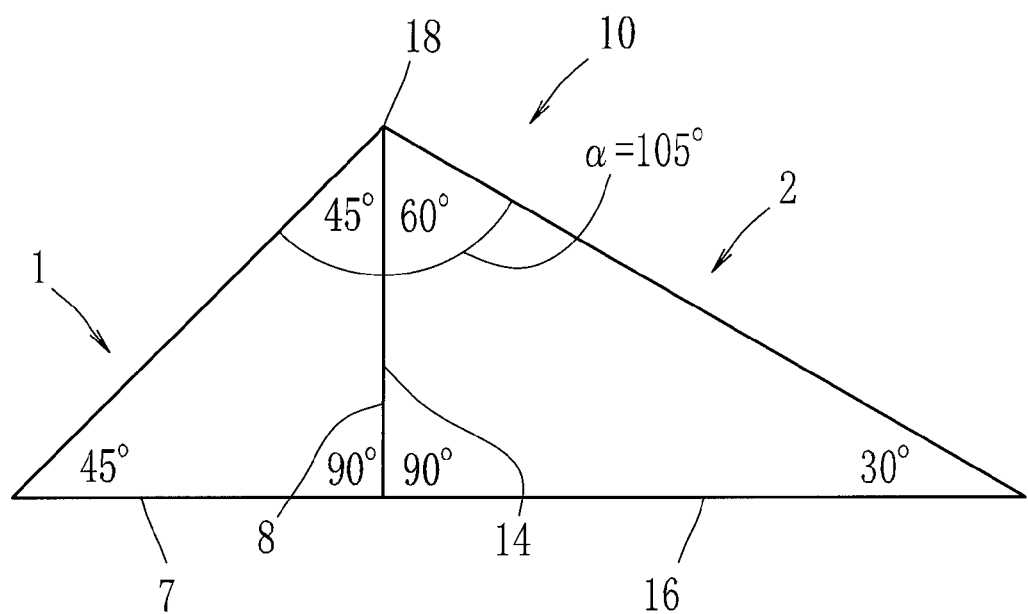
FIG. 5 is a plan view showing another example of the figure plate set concerning the first embodiment of the present invention.

FIG. 1 and FIG. 2 show an example that the length of the side 8 of the triangular plate 1 is same as the length of the side 16, which is the long side, of the triangular plate 2. The present invention is not limited to this example. Another example of the figure plate set 10 is shown in FIG. 5. The triangular plate 2 shown in FIG. 5 has a different size compared to the triangular plate 2 shown in FIG. 1, but has a similar shape. In the figure plate set 10 shown in FIG. 5, the length of the side 8 of the triangular plate 1 is same as the length of the side 14, which is the short side, of the triangular plate 2. By the above configuration, an obtuse-angled triangle having an angle of 105° can be newly formed by combining the triangular plate 1 and the triangular plate 2.

The above described configuration can also help the geometric thinking of the triangle. When the triangular plate 1 and the triangular plate 2 are combined, an obtuse-angled triangle having an angle of 105 can be formed as shown in FIG. 5. Therefore, the user can experientially understand that an angle of 105° is a sum of an angle of 45° and an angle of 60°. In addition, the user can experientially understand that the triangle having an angle of 105° is a triangle formed by combining the triangular plate 1, which is made by equally dividing a regular tetragon into two, and the triangular plate 2, which is a triangle made by equally dividing an equilateral triangle into two.

From the above, as for the triangle having an angle 105°, the user can experientially understand the positions of an angle 105°, an angle of 45° and an angle of 30°, and the relation between "ratio of side length" and "angle." From the above understanding, the user can increase the ability of the geometric thinking about the triangle. This is same as the figure plate set 10 shown in FIGS. 1 to 3. Namely, if the user experientially understands the triangle shown in FIG. 5, the user can easily find the place to draw the perpendicular line in the exercise of geometric thinking about the triangle having an angle of 105°. The figure plate set 10 can be turned over or rotated on a plane. This also helps the flexible thinking. This is same as the figure plate set 10 shown in FIGS. 1 to 3.

An angle of 105° is dealt with in the addition theorem of trigonometrical function learned in mathematics in high school. For example, a value of sin (105°) is calculated by changing the formula into sin (60°+45°) and then using the addition theorem. As described above, the user can operationally and visually understand that an angle of 105° is a sum of an angle of 60° and an angle of 45° by the figure plate set 10. If the above logic is understood in association with sin (60°+45°), the user can deepen the geometric thinking about the triangle in association with the trigonometrical function.

Figure 6:
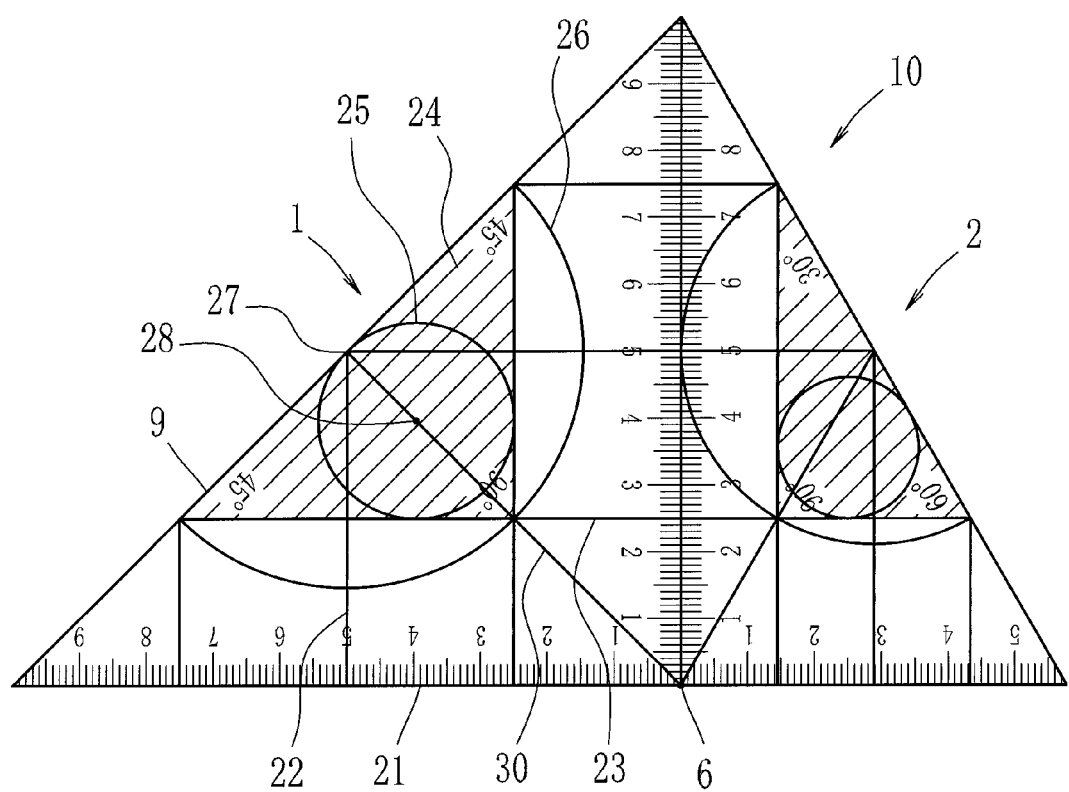
FIG. 6 is a plan view showing another example of the figure plate set concerning the first embodiment of the present invention.

FIG. 6 shows another example of the figure plate set 10. The triangular plate 1 and the triangular plate 2 shown in FIG. 6 have the same shape as the triangular plate 1 and the triangular plate 2 shown in FIG. 1. In the triangular plate 1 and the triangular plate 2 shown in FIG. 6, indicators such as a scale and a line are provided. In FIG. 6, on the triangular plate 1, scales 21 are indicated on two orthogonal sides, and vertical lines 22 and horizontal lines 23 are indicated at regular intervals. Furthermore, an inscribed circle 25 and a circumscribed circle 26 of a triangle 24 are indicated. These indicators are also indicated on the triangular plate 2 of FIG. 6. The indicators such as the scale 21 are merely examples. Necessary indicators can be arbitrarily provided.

As explained above, in the figure plate set shown in FIG. 6, an indicator indicating a similar triangle and another indicator of at least one of an inscribed circle and a circumscribed circle of the similar triangle are indicated on at least one of the first triangular plate and the second triangular plate.

In the figure plate set 10 shown in FIG. 6, the user can easily understand dimensional relationship of the sides of the triangle because the scales 21 are indicated. Since the vertical lines 22 and the horizontal lines 23 are indicated, a triangle of similar shape such as a triangle 24 can be recognized. Therefore, the user can easily understand similar figures. In the example of FIG. 6, a color is added to a part forming the triangle 24 shown as slashed lines in the figure. This helps the user to easily recognize the triangle of similar shape.

In the example shown in FIG. 6, the inscribed circle 25 and the circumscribed circle 26 of the triangle 24 are indicated. This helps the user to easily understand the relation between the triangle and the inscribed circle and between the triangle and the circumscribed circle. Since the triangle 24 is the similar triangle of the triangular plate 1, the user can substantially understand the relation between the triangular plate 1 and the inscribed circle and between the triangular plate 1 and the circumscribed circle by using only the triangular plate 1 without requiring external indicators. The above described explanations are also applied to the triangular plate 2.

Figure 7:
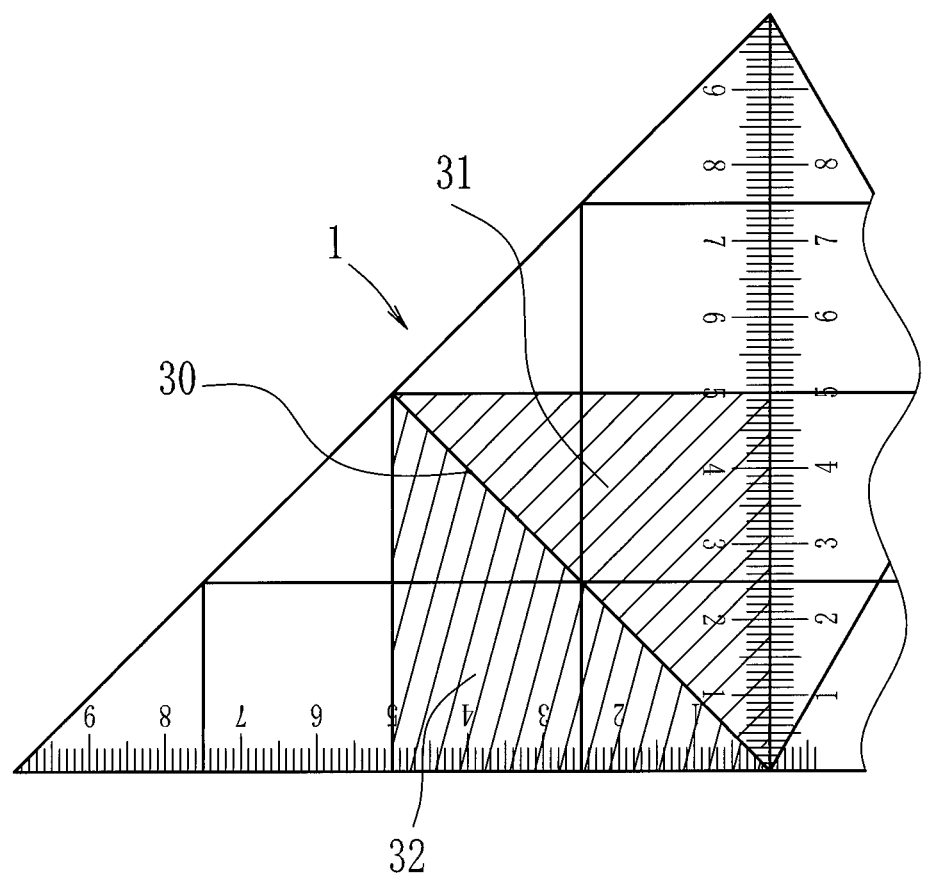
FIG. 7 is a diagram explaining an example of learning using the figure plate set shown in FIG. 6.

In FIG. 6, if a circumcenter 27 and an incenter 28 of the triangle 24 are indicated by dots, for example, the learning effect is improved. The above described explanations are also applied to the triangular plate 2. The circumcenter is a center of a circumscribed circle of the triangle. The incenter is a center of an inscribed circle of the triangle. In the triangular plate 1 shown in FIG. 6, a line 30 that connects the circumcenter 27 and the apex 6 is also indicated. The circumcenter 27 also corresponds to a position of "center of similitude" of the triangular plate 1 and the triangle 24. From the above, as shown in FIG. 7, the user can recognize a triangle 31 (shaded part) and a triangle 32 (shaded part), which are congruent triangles of the triangle 24 and have different positional relation. This helps the user to understand that the shape of the triangular plate 1, which has similar shape as the triangles 31, 32, is made by equally dividing a regular tetragon into two. In the triangular plate 2, same as the triangular plate 1, the indicators helps the user to understand the similar triangles of the triangular plate 2 and helps the user to understand that the shape of the triangular plate 2 is made by equally dividing an equilateral triangle into two.

Figure 8:
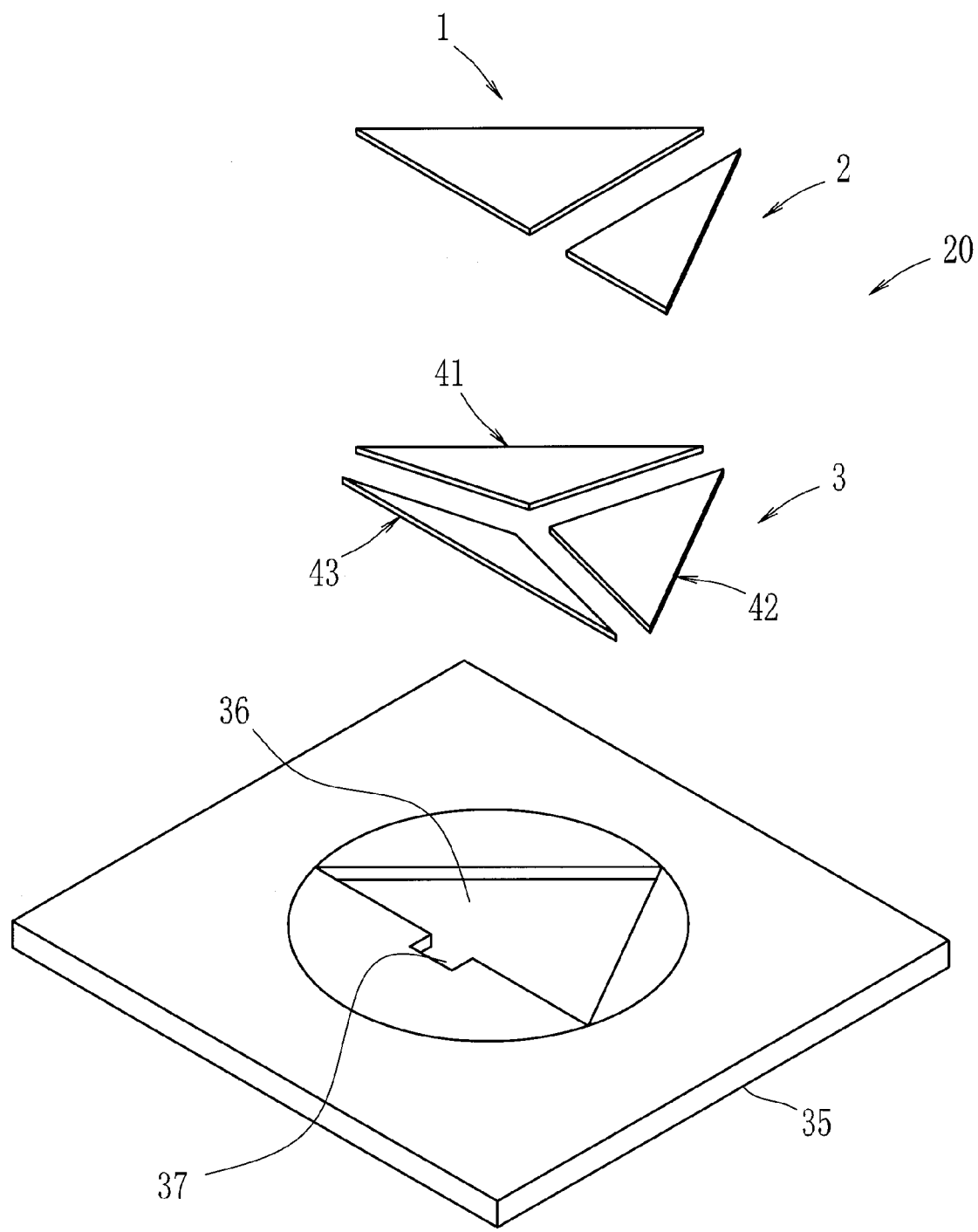
FIG. 8 is an exploded perspective view showing the figure plate set concerning the second embodiment of the present invention.

FIG. 8 is an exploded perspective view showing a figure plate set 20 concerning the second embodiment of the present invention. In FIG. 8, the figure plate set 20 includes a group of figure plates 3, in addition to the triangular plate 1 and the triangular plate 2.

The triangular plate 1 and the triangular plate 2 are same as the triangular plate 1 and the triangular plate 2 shown in FIG. 1 of the first embodiment. The indicators such as a scale and a line shown in FIG. 6 can be provided on the triangular plate 1 and the triangular plate 2.

Figure 9:
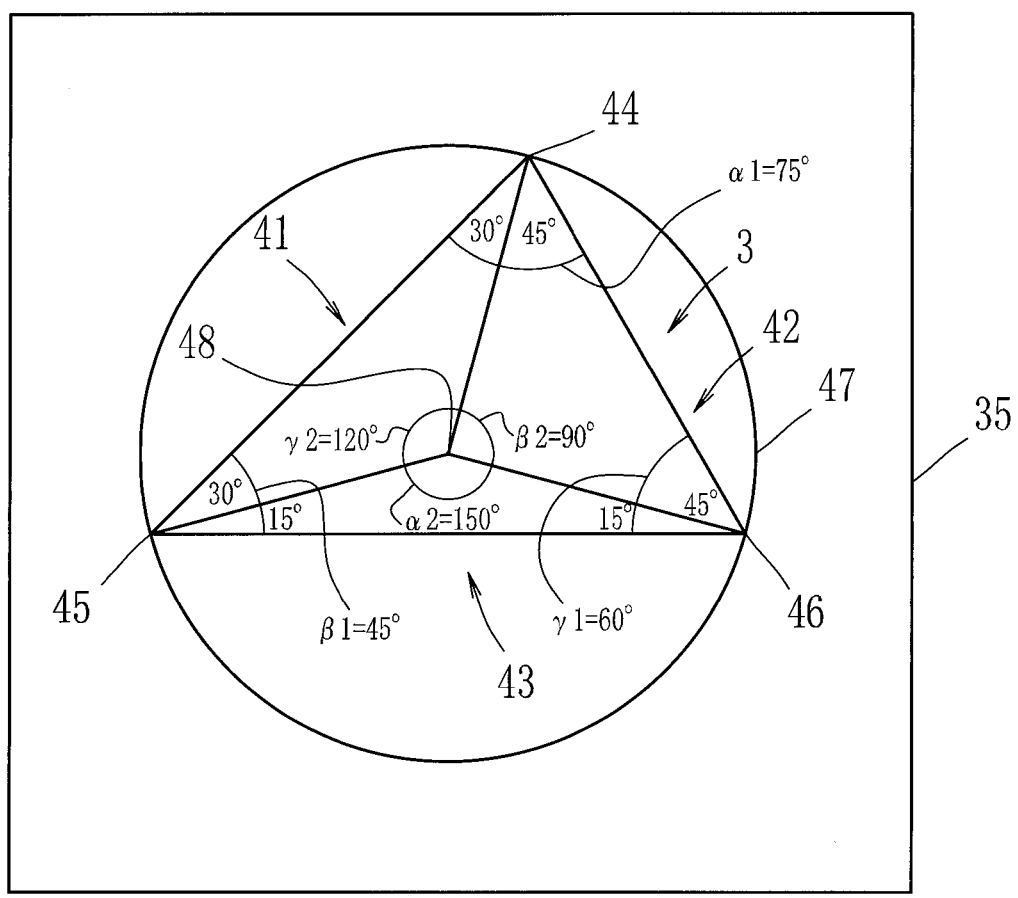
FIG. 9 is a plan view showing a state that a group of figure plates 3 shown in FIG. 8 is fitted into a concave portion of a plate member.

The group of figure plates 3 is formed by three triangular plates 41 to 43. An outer shape of the triangle formed by combining the triangular plates 41 to 43 matches the outer shape of the new triangular shape formed by combining the triangular plate 1 and the triangular plate 2. In FIG. 9, a point of contact of apexes of three triangular plates 41 to 43 matches a circumcenter 48 of the triangle formed by combining the triangular plates 41 to 43. Here, the triangle formed by combining the triangular plates 41 to 43 is same as the new triangular shape formed by combining the triangular plate 1 and the triangular plate 2.

As explained above, in the figure plate set 10 shown in FIG. 8, a group of figure plates is further provided so that an outer shape of the group of figure plates matches the new triangular shape when the group of figure plates is combined, and when the group of figure plates is combined so that the outer shape of the group of figure plates matches the new triangular shape, a point of contact of apexes of all or a part of the group of figure plates matches a circumcenter of the new triangular shape.

Since the apexes of three triangular plates 41 to 43 matches the circumcenter, lengths of two sides of the triangular plates 41 to 43 including the apexes match a radius of the circumscribed circle. Since the lengths of two sides of the triangular plates 41 to 43 including the apexes are same, the triangular plates 41 to 43 are isosceles triangles. Therefore, in the figure plate set shown in FIG. 8, the group of figure plates is formed by three pieces of triangular plates having an isosceles triangular shape.

In FIG. 8, a concave portion 36 is formed on a plate member 35 so that the triangular plate 1, the triangular plate 2, and the group of figure plates 3 are fitted into the concave portion 36. A removing slot 37 is formed on the concave portion 36 so that the triangular plates fitted into the concave portion 36 are removed easily.

As shown in FIG. 8, a circumscribed circle of the new triangular shape is indicated on the plate member 35.

Figure 10:
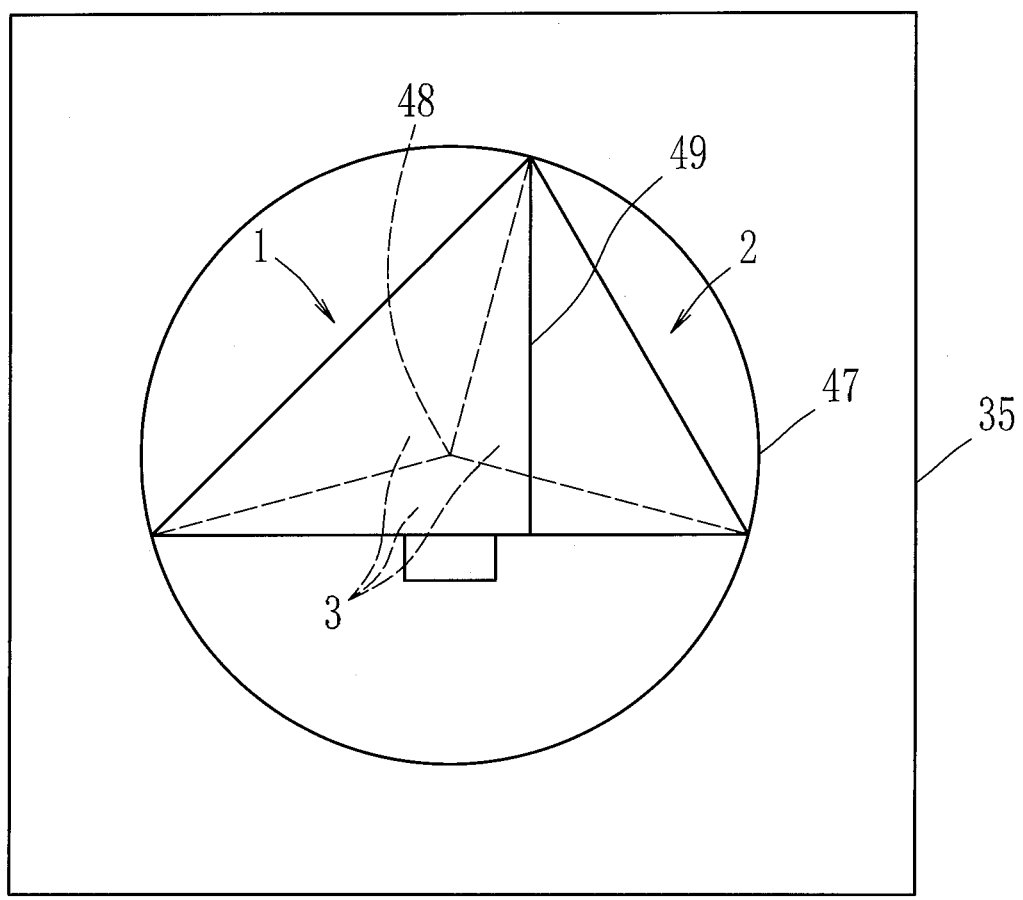
FIG. 10 is a plan view showing a state that the triangular plate 1 and the triangular plate 2 are stacked on the group of figure plates 3 shown in FIG. 8 in two layers.

FIG. 9 is a plan view showing a state that the group of figure plates 3 formed by three pieces is fitted into the concave portion 36 of the plate member 35. FIG. 10 is a plan view showing a state that the triangular plate 1 and the triangular plate 2 are stacked on the group of figure plates 3 in two layers. FIG. 9 shows a state that the group of figure plates 3 is fitted into the concave portion 36 while the sides of three triangular plates 41 to 43 are aligned. FIG. 10 shows a state that the triangular plate 1 and the triangular plate 2 are stacked on the group of figure plates 3 and fitted into the concave portion 36 from the state of FIG. 9. Therefore, FIG. 10 shows the state that the triangular plate 1, the triangular plate 2, and the group of figure plates 3 are stored from the state of FIG. 8. In the state of FIG. 10, the triangular plate 1 and the triangular plate 2 are stacked on the group of figure plates 3 in two layers.

In the above configuration, the group of figure plates 3 and the triangle having the same shape as the group of figure plates 3 formed by combining the triangular plate 1 the triangular plate 2 are stacked in two layers. The circumcenter 48 (FIG. 9) can be visually recognized only after the group of figure plates 3 is combined. From the above, the user can recognize that three triangular plates 41 to 43 are triangles made by dividing the triangle formed by combining the triangular plate 1 and the triangular plate 2 based on the circumcenter. Therefore, the user can deepen the understanding of the circumcenter of the triangle. Namely, in addition to combining three triangular plates 41 to 43, by stacking the triangular plate 1 and the triangular plate 2 on the triangular plates 41 to 43, the user can understand the relation between the circumscribed circle of the triangle and the circumcenter.

In the group of figure plates 3 shown in FIG. 9, a plate member 35 is further provided so that the first triangular plate, the second triangular plate and the group of figure plates are fitted into the plate member 35 in two layers.

In the example of FIG. 9, the angles at each of the apexes are indicated on three triangular plates 41 to 43. A circumscribed circle 47 of the group of figure plates 3 is indicated on the plate member 35. By the above configuration, the circumscribed circle 47 can be visually recognized. Therefore, the user can understand the relation between the circumscribed circle of the triangle and the circumcenter. Since the triangular plate 1, the triangular plate 2, and the group of figure plates 3 can be fitted into the concave portion 36 of the plate member 35, three triangular plates 41 to 43, the triangular plate 1, and the triangular plate 2 can be combined while being positioned. This helps the user to learn easily and to store the figure plate set easily.

In addition, this helps the user to understand a relation between a circumferential angle and a central angle. Specifically, in FIG. 9, a circumferential angle $\alpha 1$ at an apex 44 is 75°, which is a sum of 30° and 45°. A central angle $\alpha 2$ corresponding to the circumferential angle $\alpha 1$ is 150°. From the above, it can be confirmed that the central angle $\alpha 2$ and the circumferential angle $\alpha 1$ satisfy a relation that the central angle $\alpha 2$ is twice as large as the circumferential angle $\alpha 1$. This relation is also satisfied between a circumferential angle $\beta 1$ and a central angle $\beta 2$ at an apex 45 and between a circumferential angle $\gamma 1$ and a central angle $\gamma 2$ at an apex 46.

When learning the relation between the circumferential angle and the central angle described above, three triangular plates 41 to 43 are combined as shown in FIG. 9. Therefore, the user can experientially learn from an operation of combining the triangular plates. If the angles are indicated near the apexes of the triangular plates 41 to 43, the user can easily understand the relation between the circumferential angle and the central angle. However, even if the angles are not indicated, the above described guide can help the user.

Although FIG. 10 shows a state that the triangular plate 1 and the triangular plate 2 are stacked on the group of figure plates 3 in two layers, the arrangement of the two layers can be reversed. In such a case, the group of figure plates 3 is stacked on the triangular plate 1 and the triangular plate 2. If the triangular plate 1 and the triangular plate 2 are specified to be transparent or translucent, a dividing line of the group of figure plates 3 can be confirmed from above the triangular plate 1 and the triangular plate 2. From the above, a relation between the circumscribed circle of the triangle and the circumcenter can be confirmed without removing the triangular plate 1 and the triangular plate 2 from the plate member 35. In addition, a positional relation between the circumcenter 48 and a dividing line 49 (i.e. perpendicular line) of the triangular plate 1 and the triangular plate 2 can be visually confirmed. Therefore, the user can deepen the understanding the position of the circumcenter 48.

Figure 11:
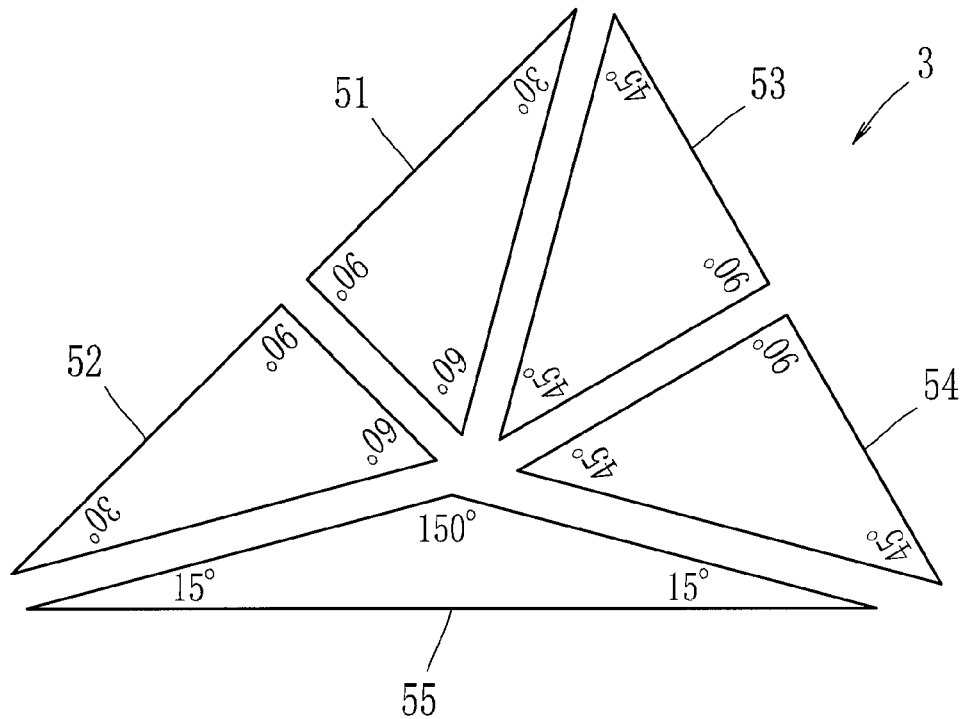
FIG. 11 is a plan view showing another example of the group of figure plates 3 concerning the second embodiment of the present invention.

FIG. 11 shows another example of the group of figure plates 3. The group of figure plates 3 shown in FIG. 11 is formed by five triangular plates 51 to 55. The triangular plate 51 and the triangular plate 52 are made by equally dividing the triangular plate 41 shown in FIG. 8. The triangular plate 51 and the triangular plate 52 are a right-angled triangle having an angle of 60° and an angle of 30° made by equally dividing an equilateral triangle into two.

In the group of figure plates 3 shown in FIG. 11, the group of figure plates is formed by five pieces of triangular plates, one of the triangular plates has an isosceles triangular shape having an angle of 15°, two of the triangular plates have a right-angled triangular shape having angles of 60° and 30°, the right-angled triangular shape being made by equally dividing an equilateral triangle into two, and another two of the triangular plates have an isosceles right triangular shape having angles of 45°, the isosceles right triangular being made by equally dividing a regular tetragon into two.

The triangular plate 53 and the triangular plate 54 are made by dividing the triangular plate 42 shown in FIG. 8 into two. The triangular plate 53 and the triangular plate 54 are an isosceles right triangle having an angle of 45° made by equally dividing a regular tetragon into two. The triangular plate 55 is same as the triangular plate 43 of FIG. 8. Same as the group of figure plates 3 of FIGS. 8 and 9, in the group of figure plates 3 of FIG. 11, a point of contact of apexes of five triangular plates 51 to 55 matches a circumcenter of the triangle formed by combining the group of figure plates 3. Although FIG. 11 is an example of indicating the angles, the angles are not necessarily indicated. If the above described guide is simultaneously used, for example, the user can learn while considering the angles.

Figure 12:
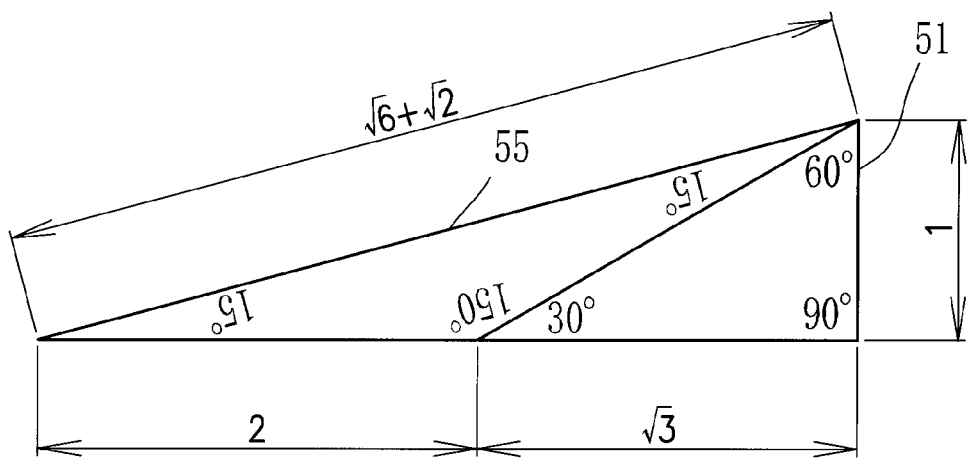
FIG. 12 is a diagram showing an application example of the group of figure plates 3 shown in FIG. 11 used for leaning.

In the group of figure plates 3 of FIG. 11, the number of pieces is increased from three to five. Therefore, application range for learning is extended. FIG. 12 shows an application example of the group of figure plates 3 shown in FIG. 11. The triangle shown in FIG. 12 is formed by combining the triangular plate 55 and the triangular plate 51 of the group of figure plates 3 shown in FIG. 11. From the combination above, a triangle having angles of 15°, 75° and 90° at the apexes is formed. While confirming angles and dimensions of this triangle, the user can learn a positional relation of the length of a sum of √6 and √2 used in the trigonometrical function. Although the length of the sum of √6 and √2 cannot be directly calculated from the shape of the triangular plate, the user can understand it by simultaneously using the guide shown in FIG. 12 since the feature of the triangle is written in the guide.

The five triangular plates 51 to 55 can be classified by color to distinguish either of the triangular plate 55 having an angle of 15°, the triangular plate 51 and the triangular plate 52 having an angle of 60° and an angle of 30°, and the triangular plate 53 and the triangular plate 54 having an angle of 45°. From the above configuration, the user can visually understand the shapes. In addition, when arbitrarily combining the five triangular plates 51 to 55, the user can associate the colors with the angles. Thus, the learning effect is improved. Similarly, if the three triangular plates 41 to 43 shown in FIG. 8 are classified by color according to the shapes, the user can visually understand the shapes.

As explained above, the group of figure plates can be classified by color according to a shape of the figure plates.

In addition, the five pieces of triangular plates can be classified by color so that the isosceles triangle having an angle of 15°, the right-angled triangle having angles of 60° and 30°, and the isosceles triangle having angles of 45° can be distinguished from others.

In the above embodiment, the leaning using the triangular plates is explained. The triangle is the basic of plane figures. Therefore, if the user structurally understands the triangle, the user can apply the understanding to a quadrangle and other figures. For example, in the group of figure plates 3 shown in FIG. 11, a regular tetragon can be formed by combining the triangular plate 53 and the triangular plate 54 at adjacent sides.

In the above described embodiment, the number of pieces of the triangular plates that forms the group of figure plates 3 is three or five as examples. However, the number of pieces of the triangular plates can be four, six or more. The figure plates that form the group of figure plates 3 can include the quadrangle and other figures than the triangle as long as the triangle is formed when combined with each other. The group of figure plates 3 can be any shapes as long as the circumcenter of the triangle can be visually confirmed when combined with each other to form the triangle. The circumcenter does not have to match the apexes of all of figure plates. Namely, the circumcenter can match the apexes of a part of figure plates.

The dividing line of the triangle formed by combining the group of figure plates 3 can be indicated on the triangular plate 1 and the triangular plate 2. In such a case, the group of figure plates 3 can be omitted from the figure plate set of FIG. 8.

By the above configuration, in the group of figure plates, a line that divides the new triangular shape into a plurality of figures is indicated on the first triangular plate and the second triangular plate, and a point of contact of apexes of all or a part of the plurality of figures matches with the circumcenter of the new triangular shape.

Only the triangular plates are fitted into the plate member 35 in the second embodiment shown in FIG. 8. However, a protractor, a straight plate, a compass or other tools can be fitted into the plate member 35 at a position avoiding the triangular plates. Materials of the triangular plate 1, the triangular plate 2, and the group of figure plates 3 are not particularly limited. Resin materials and paper materials can be used, for example.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A figure plate set for learning, comprising:
a first triangular plate having angles of 45° and 90°; and
a second triangular piate having angles of 30°, 60° and 90°, wherein
a length of one of two orthogonal sides of the first triangular plate is same as a length of one of two orthogonal sides of the second triangular plate,
a new triangular shape can be formed by combining the first triangular plate and the second triangular plate,
a group of figure plates is further provided so that an outer shape of the group of figure plates matches the new triangular shape when the group of figure plates is combined, and
when the group of figure plates is stacked with the first triangular plate and the second triangular plate so that the outer shape of the group of figure plates matches the new triangular shape, a point of contact of apexes of all of the group of figure plates matches a circumcenter of the new triangular shape.

2. The figure plate set according to claim 1, wherein
a plate member is further provided so that the first triangular plate, the second triangular plate and the group of figure plates are fitted into the plate member in two layers.

3. The figure plate set according to claim 2, wherein
a circumscribed circle of the new triangular shape is shown on the plate member.

4. The figure plate set according to claim 1, wherein
the group of figure plates is formed by three pieces of triangular plates having an isosceles triangular shape.

5. The figure plate set according to claim 1, wherein
the group of figure plates is formed by five pieces of triangular plates,
one of the triangular plates has an isosceles triangular shape having an angle of 15°,
two of the triangular plates have a right-angled triangular shape having angles of 60° and 30°, the right-angled triangular shape being made by equally dividing an equilateral triangle into two, and
another two of the triangular plates have an isosceles triangular shape having angles of 45°, the isosceles triangular shape being made by equally dividing a regular tetragon into two.

6. The figure plate set according to claim 1, wherein
the group of figure plates is classified by color according to a shape of the figure plates.

7. The figure plate set according to claim 5, wherein
the five pieces of triangular plates are classified by color so that the isosceles triangle having an angle of 15°, the right-angled triangle having angles of 60° and 30°, and the isosceles triangle having angles of 45° can be distinguished from others.

8. The figure plate set according to claim 1, wherein
an indicator indicating a similar triangle and another indicator of at least one of an inscribed circle and a circumscribed circle of the similar triangle are indicated on at least one of the first triangular plate and the second triangular plate.

9. The figure plate set according to claim 1, wherein
a line that divides the new triangular shape into a plurality of figures is indicated on the first triangular plate and the second triangular plate, and a point of contact of apexes of all or a part of the plurality of figures matches with the circumcenter of the new triangular shape.

\* \* \* \* \*